United States Patent [19]

Berry

[11] 4,169,506

[45] Oct. 2, 1979

[54] IN SITU RETORTING OF OIL SHALE AND ENERGY RECOVERY

[75] Inventor: Kay L. Berry, Denver, Colo.

[73] Assignee: Standard Oil Company (Indiana), Chicago, Ill.

[21] Appl. No.: 815,994

[22] Filed: Jul. 15, 1977

[51] Int. Cl.$^2$ .................. E21B 43/24; E21C 41/10
[52] U.S. Cl. .................. 166/256; 166/259; 166/267; 166/303; 55/23; 299/2; 423/573 G
[58] Field of Search .............. 166/256, 259, 265, 266, 166/267, 303; 299/2; 208/11 R; 423/572, 573 G; 55/23, 342, 467

[56] References Cited

U.S. PATENT DOCUMENTS

| 1,083,250 | 12/1913 | Hall | 423/572 |
|---|---|---|---|
| 1,269,747 | 6/1918 | Rogers | 299/2 |
| 1,942,131 | 1/1934 | Baumann et al. | 55/23 |
| 3,548,938 | 12/1970 | Parker | 166/256 |
| 3,845,196 | 10/1974 | Rhoades | 166/267 X |
| 3,915,498 | 10/1975 | Burton et al. | 166/256 X |
| 3,999,607 | 12/1976 | Pennington et al. | 166/259 |
| 4,014,575 | 3/1977 | French et al. | 166/256 X |
| 4,019,577 | 4/1977 | Fitch et al. | 166/259 |
| 4,029,360 | 6/1977 | French | 166/256 X |
| 4,041,130 | 8/1977 | Mackles | 423/573 G X |
| 4,043,393 | 8/1977 | Fisher et al. | 166/256 X |

FOREIGN PATENT DOCUMENTS

| 744571 | 10/1966 | Canada | 166/265 |
|---|---|---|---|
| 727028 | 3/1955 | United Kingdom | 55/23 |
| 889297 | 2/1962 | United Kingdom | 55/23 |

OTHER PUBLICATIONS

McCrank et al., Power Generation from Shale Oil Process Off-Gas, ASME Publication, 76-JPGC-GT-4, 1976.

Perry; Robert H. et al., Chemical Engineers' Handbook, Fifth Edition, McGraw-Hill, 1973, pp. 18-90 to 18-92.

Ridley; Richard D. et al., In Situ Oil Shale Process Development, Quarterly of the Colorado School of Mines, vol. 70, Jul. 1975, No. 3, pp. 123-127.

*Primary Examiner*—Stephen J. Novosad
*Assistant Examiner*—George A. Suchfield
*Attorney, Agent, or Firm*—Frank J. Sroka; Arthur G. Gilkes; William T. McClain

[57] ABSTRACT

Disclosed is a process for the in situ retorting of oil shale and energy recovery from generated off gases. An underground retort containing rubblized oil shale is subjected to retorting, thereby forming shale oil and off gases. The off gases are purified and burned in a gas turbine. Commonly this process comprises forming a subterranean in situ retort containing rubblized oil shale having a void space of about 5 to about 40 percent; passing a retorting gas through the in situ retort to effectively retort the oil shale and produce a mixture of shale oil and off gases; subjecting the mixture of shale oil and off gases to a preliminary separation to remove gross quantities of shale oil from the off gases; passing a portion of the off gases to a purification zone so as to remove off gas impurities which would be detrimental to the environment or the operation of downstream equipment; and passing a portion of the purified off gases to a gas turbine where said off gases are burned and power is generated.

10 Claims, 1 Drawing Figure

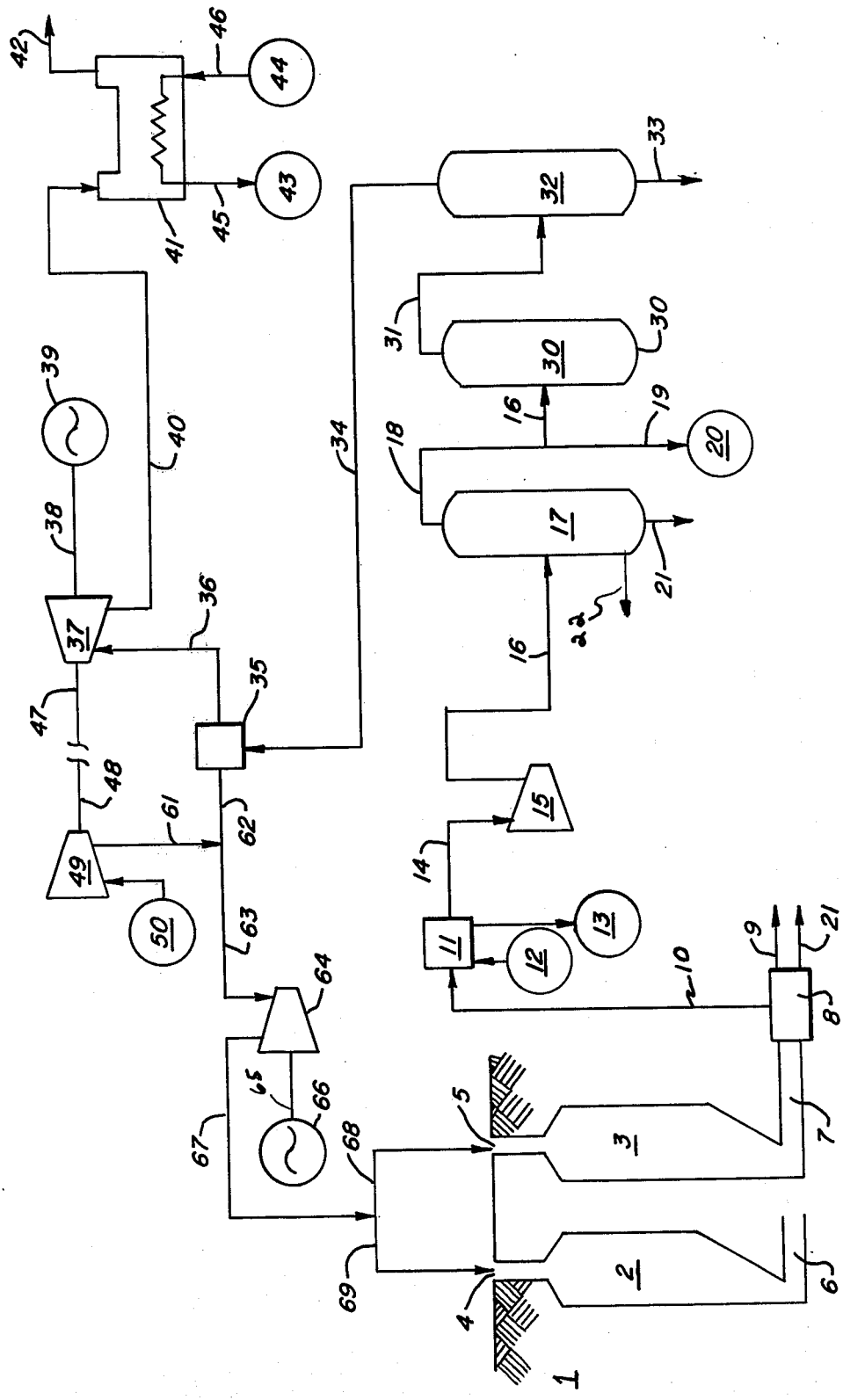

IN SITU RETORTING OF OIL SHALE AND ENERGY RECOVERY

BACKGROUND

This invention relates to recovery of energy from underground carbonaceous deposits. More specifically, this invention relates to the in situ retorting of oil shale and energy recovery from generated off gases.

The term oil shale refers to sedimentary deposits containing organic materials which can be converted to shale oil. Oil shale contains an organic material called kerogen which is a solid carbonaceous material from which shale oil can be retorted. Upon heating oil shale to a sufficient temperature, kerogen is decomposed and a liquid product is formed.

Oil shale can be found in various places throughout the world, especially in the United States in Colorado, Utah and Wyoming. Some especially important deposits can be found in the Green River formation in Piceance Basin, Garfield and Rio Blanco counties, and northwestern Colorado.

Oil shale can be retorted to form a hydrocarbon liquid either by in situ or surface retorting. In surface retorting, oil shale is mined from the ground, brought to the surface, and placed in vessels where it is contacted with hot retorting gases. The hot retorting gases cause shale oil to be freed from the rock. Spent retorted oil shale which has been depleted in kerogen is removed from the reactor and discarded.

Another method of retorting oil shale is the in situ process. In situ retorting oil shale generally comprises forming a retort or retorting area underground, preferably within the oil shale zone. The retorting zone is formed by mining an access tunnel to or near the retorting zone and then removing a portion of the oil shale deposit by conventional mining techniques. About 5 to about 40 percent, preferably about 15 to about 25 percent, of the oil shale in the retorting area is removed to provide void space in the retorting area. The oil shale in the retorting area is then rubblized by well-known mining techniques to provide a retort containing rubblized shale for retorting.

A common method for forming the underground retort is to undercut the deposit to be retorted and remove a portion of the deposit to provide void space. Explosives are then placed in the overlying or surrounding oil shale. These explosives are used to rubblize the shale, preferably forming an area of rubble having uniform particle size. Some of the techniques used for deforming the undercut area and the rubblized area are room and pillar mining, sublevel caving, and the like. After the underground retort is formed, the pile of rubblized shale is subjected to retorting. Hot retorting gases are passed through the rubblized shale to effectively form and remove liquid hydrocarbon from the oil shale. This is commonly done by passing a retorting gas such as air or air mixed with steam and/or hydrocarbons through the deposit. Most commonly, air is pumped into one end of the retort and a fire or flame front initiated. This flame front is then passed slowly through the rubblized deposit to effect the retorting. Not only is shale oil effectively produced, but a mixture of off gases from the retorting is also formed. These gases contain carbon monoxide, ammonia, carbon dioxide, hydrogen sulfide, carbonyl sulfide, and oxides of sulfur and nitrogen. Generally a mixture of off gases, water and shale oil are recovered from the retort. This mixture undergoes preliminary separation commonly by gravity to separate the gases from the liquid oil from the liquid water. The off gases commonly also contain entrained dust and hydrocarbons, some of which are liquid or liquefiable under moderate pressure. The off gases commonly have a very low heat content, generally less than about 100 to about 150 BTU per cubic foot.

Because underground retorts are generally quite large in size and large quantities of air or oxygen containing gases are needed to support combustion, large amounts of off gases are formed during retorting. Because these off gases contain both impurities and also recoverable energy, it is highly desirable to find an effective method of treating these gases and also recovering energy in useable form. It is also quite important that these off gases are treated in such manner as to be compatible with the environment.

A number of patents describe methods of in situ retorting of oil shale. Kerrick, L. C., U.S. Pat. No. 1,913,395, is directed to the in situ gasification of underground carbonaceous materials, such as oil shale. After an access tunnel from the surface is formed, about 10 to 40 percent of the gasification zone is mined out in order to provide voids in the deposits and to provide various tunnels. Long drill holes are made in the roof, walls and floor of certain tunnels to be filled with explosives which will form a rubble suitable for burning or gasification. The proper spacing of the blast holes including their depth, size of powder charge and order of firing are considered important. It is thought that this technique will break the deposit sufficiently to form loose previous masses of uniform permeability. It is preferred to use a steeply sloping or vertical combustion chamber when working deposits such as oil shale from Colorado. Downflow of oxygen as a combustion gas is shown.

Kerrick, S. M., U.S. Pat. No. 1,919,636, teaches the in situ recovery of oil shale in large vertical chambers or tunnels which are substantially full of broken shale. Hot retorting gases are passed either downwardly or upwardly through the chambers. The vertical retorting areas can be formed by mining small sloping branch raises or slots. The walls of these raises are drilled and blasted from bottom to top, filling the chamber with broken material. Oil shale is removed to provide a porosity of 25 to 40 percent. Retorting is conducted with downflow of retorting gases such as air and combustible gas. Another technique for rubblizing oil shale is described in conjunction with FIG. 10. A number of development tunnels are drilled at the base of the oil shale deposit to provide a work area and void space. Next holes are drilled into the roof of the tunnel, filled with explosives and detonated to break the roof in large blocks averaging 2-3 feet in minimum diameter. Another round of holes are drilled and fired, each round bringing the pile of broken shale nearer to the roof. In this case the retort is horizontal. Retorted shale oil collects initially at the bottom of the retort.

Uren, U.S. Pat. No. 2,481,051, is directed to a method of in situ distillation of carbonaceous materials such as oil shale. An access tunnel down into the deposit is mined from which mine drifts and raises are driven under, over and through the deposit selected for treatment. The mined oil shale is removed. Commonly the mine drifts are separated vertically by about 150 feet of oil shale. Various methods of stoping may be employed such as shrinkage stoping or block caving. Shrinkage stoping is recommended. In this method the rock is excavated progressively upward from one level to the next, the miners drilling and blasting away the overhead "back". The miners stand and set up their equipment upon the rock previously broken, just enough of the broken material being drawn through chutes into drifts below to leave suitable head room between the back and the top of the broken rock. In this method of stoping, approximately ⅓ of the rock may be withdrawn and ⅔ remains in the stope. Retort combustion is generally conducted in a downward direction by the initial injection of air and combustible fuel or gas and subsequently by either air injection alone or in conjunction with fuel. Shale oil is recovered at the bottom of the retort.

Van Poollen, U.S. Pat. No. 3,001,776, is directed to the in situ retorting of oil shale and teaches that the retorts can be formed by well-known mining practices which may include sublevel stoping, shrinkage stopes, sublevel caving or block caving. An access shaft is mined with various drifts so that the retorting area can be worked at a plurality of levels. The overlaying oil shale above a stope is fractured, generally by explosives detonated in blast holes in the overhead deposit. Some of the oil shale is removed to achieve the desired porosity. The retort filled with rubble can be retorted in either the upflow or downflow direction by the injection of air. Ignition can be accomplished by any suitable method such as oxygen used in conjunction with natural gas.

Ellington, U.S. Pat. No. 3,586,377, is directed to a method of in situ recovery of shale oil. The method of obtaining shale oil from a zone of unmined oil shale comprises establishing access means at least two points in said zone, establishing communication between these access means through the zone, fragmenting at least part of the oil shale in the zone in the area of the communication to produce a porous mass of fragmented oil shale, supplying heating means to said fragmented oil shale through one of said access points to pyrolyze shale oil in the oil shale and collecting said shale oil through the other of said access means.

Prats, U.S. Pat. No. 3,434,757, is directed to a method of in situ recovery of shale oil wherein the rubblized oil shale is created by forming at least two tunnels, exploding the archways between the tunnels and thereby creating a large roof which collapses. Another series of explosives extending radially upward and substantially parallel to the tunnels is detonated to rubblize the overlaying oil shale. Hot fluid is then circulated through the permeable mass of oil shale to release the shale oil.

Garret, U.S. Pat. No. 3,661,423, is directed to the recovery of carbonaceous values by in situ retorting of rubblized deposits such as oil shale. A limited undercut is made over a large area leaving an overlaying deposit supported by a multiplicity of pillars. The pillars are then removed and the overlaying deposit expanded to fill the void with particles of uniform size, porosity and permeability. Communication is then established with the upper level of the expanded deposit and a high temperature gaseous media which will liquefy or vaporize the carbonaceous values is introduced in a manner which causes the released values to flow downward for collection at the base of the expanded deposit. Convenient media are hot flue gases created by igniting the upper level of the expanded carbonaceous deposit forcing a flow of hot gases downward through the expanded deposit.

Ridley, U.S. Pat. No. 3,951,456, discloses an in situ process for recovering carbonaceous values from a subterranean deposit comprising the steps of (a) developing an in situ rubble pile within a retorting chamber of a subterranean carbonaceous deposit having a retorting fluid entrance and retorting fluid exit, said rubble pile being formed by undercutting at about the base of the carbonaceous deposit to remove a predetermined volume of material and form a sloped floor having a high point at the shortest retorting fluid path between the retorting fluid entrance and the floor and the low point at the periphery of the floor and expanding the deposit to form the in situ rubble pile wherein the bulk permeability of the rubble pile increases from the shortest retorting fluid path to the longest retorting fluid path between the retorting fluid entrance and the retorting fluid exit so that the resistance to retorting fluid flow through the rubble pile along all retorting fluid paths is approximately equal; (b) establishing the retorting fluid entrance between the rubble pile and a source of retorting fluid; (c) establishing the retorting fluid exit between the rubble pile and a destination for the retorting fluid, the exit communication with the rubble pile being spaced by at least a portion of the rubble pile from the retorting fluid entrance; (d) retorting the rubble pile to extract the carbonaceous values therefrom, the retorting step including the passage of the retorting fluid through the rubble pile along the retorting fluid paths; and (e) recovering the retorted carbonaceous values.

In is an object of this invention to provide an effective method of in situ retorting of oil shale and recovering energy from generated off gases.

It is an object of this invention to provide a method of treating off gases from in situ retorting process so that those gases can be used in power generating equipment.

It is an object of this invention to maximize oil recovery from in situ oil shale retorting.

It is further an object of this invention to maximize the energy recovery from in situ retorting off gases.

It is still further an object of this invention to provide an integrated retorting gas treatment scheme for the effective retorting of oil shale and energy recovery from generated off gases.

SUMMARY OF THE INVENTION

This invention relates to recovery of energy from underground carbonaceous deposits. More specifically, this invention relates to the in situ retorting of oil shale and energy recovery from generated off gases.

Generally, the process for the in situ retorting of oil shale and energy recovery from generated off gases comprises forming a subterranean in situ retort containing rubblized oil shale having a void space of about 5 to about 40 percent; passing a retorting gas through the in situ retort to effectively retort the oil shale and produce a mixture of shale oil and off gases; subjecting the mixture of shale oil and off gases to a preliminary separation to remove gross quantities of shale oil from the off gases; passing a portion of the off gases to a purification zone so as to remove off gas impurities which would be detrimental to the environment or operation of downstream equipment; and passing a portion of the purified off gases to a gas turbine where said off gases are burned and power is generated.

Commonly the purification zone removes off gas impurities which are harmful to downstream equipment or which are environmentally unacceptable or form environmentally unacceptable products when they are burned.

Often the purification zone removes dust particles from the off gases. These dust particles can be detrimental to downstream equipment such as compressors, pumps, and the like. Therefore, a portion or all of the off gases are passed to a dedusting zone wherein the concentration of dust in the off gases is reduced to a level which would not be detrimental to downstream equipment. The concentration of dust in the off gases is reduced as is technically and economically possible, preferably to less than about 1 grain per cubic foot of gas.

Dedusting can be accomplished a number of ways. The dust can be removed by cyclone separators on the basis of their different density from the gases. These cyclone separators are commonly used to remove small particles from gases or liquids in others processes, for example, petroleum catalytic cracking. Dedusting can also be accomplished by contacting the dust containing gases with a liquid which will remove and entrain the dust. The liquid can then be discarded or regenerated by filtration, distillation or other treating means. For example, when the preferred liquid of water is used, it can be passed to gravity separation, a cyclone type separation, to waste water treatment or for use as process water where the dust would not cause fouling problems or be detrimental to equipment. Water formed during retorting and water which has contacted produced shale oil or in situ retorting off gases can be expected to contain oil and grease; sulfates; fluorides; phenols; nitrogen compounds, especially ammonia; chloride; cyanide; arsenic; and others. A suitable waste water treatment scheme can be used for the purification of such water, preferably an activated sludge process. In some cases, it would be useful to use light hydrocarbons such as distillates, naphthas, and the like to remove dust from the off gases.

Because a high concentration of the sulfur and nitrogen compounds is found in shale oil, it is generally desirable to remove a substantial amount of shale oil entrained or vaporized in the off gases prior to passing the off gases to a combustion zone. This will prevent corrosion problems and reduce undesirable pollutants in off-gas from the turbine in addition to increasing total oil recovery. It will also increase the amount of liquid product shale oil recovered from the retorting operation. This removal can be effectuated by passing a portion of the off gases to a deoiling zone wherein a substantial amount of shale oil and easily condensable hydrocarbons entrained in the off gases are removed. It is preferred to reduce the oil content ($C_4$+hydrocarbons) to less than about 500 ppm.

A most common method to deoil the off gases is to compress the gas, thereby liquefying those hydrocarbon components which are easily liquefied. Commonly, water will also be removed from the off gases during this deoiling step. The compression step is commonly carried out by a multistage compression process with interstage cooling. Generally after compression, the gas mixture is passed to a knock-out drum or preferably an absorber to remove liquids. Commonly, the entrained shale oil is removed by increasing the pressure of the off gases to at least about 150 psig, preferably about 150 to about 200 psig. Another method of deoiling the off gases is to scrub the off gases with a hydrocarbon such as a naphtha fraction wherein the light hydrocarbons in the off gas are absorbed into the scrubbing hydrocarbon. Still another method of deoiling would be to use refrigeration to cool and condense the liquid hydrocarbon.

The off gases from in situ retorting commonly contain sulfur compounds, such as hydrogen sulfide, mercaptans, oxides of sulfur, and in some cases carbonyl sulfide. Because many of these can be harmful to equipment or the environment, or their oxidation products can be harmful to the environment, the off gases are purified to substantially reduce the amount of various sulfur compounds. As has been pointed out earlier, some sulfur compounds have been removed from the off gases during deoiling. Other sulfur compounds such as carbonyl sulfide can be hydrogenated or hydrolyzed to hydrogen sulfide. In most instances, the hydrolysis of carbonyl sulfide occurs slowly, however, several methods have been devised for driving the hydrolysis toward completion. Commonly alkaline solutions or moist suspension of heavy metal salts impregnated on solid adsorbents hydrolyze about 85 to about 100 percent of the carbonyl sulfide. In some cases, solutions containing about 0.8 percent sodium aluminate and about 3 percent sodium hydroxide can catalyze the hydrolysis of 85–90 percent of the carbonyl sulfide present, as in U.S. Pat. No. 2,434,868. Other methods of hydrolysis can be found in U.S. Pat. Nos. 2,362,669; 2,362,670; 2,315,662; and 2,315,663. A more complete discussion of the conversion of carbonyl sulfide by hydrogenation of hydrolysis can be found in *Gas Purification*, Second Edition; Riesenfeld, F. C. and Kohl, A.L., Gulf Publishing Company (1974).

Commonly, the hydrolysis is conducted with water and a catalyst such as caustic. One conventional method of removing carbonyl sulfide is by washing with dilute caustic soda. The reaction proceeds in two stages: a slow mass transfer of carbonyl sulphide to the aqueous phase, favored by low caustic strength, followed by hydrolysis to carbon dioxide and hydrogen sulphide, favored a high caustic strength. Since the first reaction is the rate-limiting one, a low concentration of about 3 percent weight is considered to be the best. It is preferable to reduce the concentration of carbonyl sulfide to as low as is commercially practical, preferably less than about 10 ppm in the off gases.

The hydrogen sulfide formed during hydrolysis or hydrogenation and also hydrogen sulfide formed during in situ retorting can then be removed by well known scrubbing or sulfur recovery means. Generally, the concentration of hydrogen sulfide is reduced as low as commercially practical, preferably less than about 10 ppm in the off gases.

Hydrogen sulfide can be converted, for example, by a modified Claus process. Sour gas is fed a reactor furnace with sufficient air to permit ultimate conversion of the $H_2S$ into sulphur plus combustion of any hydrocarbons present. The pressure of the streams is normally in the 5–10 psig range. After combustion, heat is commonly recovered from the reaction gases in a waste-heat boiler. The reaction gases will contain a mixture of $H_2S$, $SO_2$, sulphur and inerts at this point. The main portion of the stream is taken through a condenser or wash tower, cooled and the sulphur is knocked out. Then together with some hot gas bypass gases are passed through a converter, commonly containing a bauxite catalyst, where $H_2S$ reacts with $SO_2$ for further elemental sulphur production. After further steps of condenser, converter, condenser, the waste gases are incinerated, to oxidize any remaining traces of H$_2$S, and vented from a stack.

Off gases from in situ retorting commonly contain high concentrations of carbon dioxide. Therefore, before hydrogen sulfide can be treated in a Claus plant, it must be concentrated. One common method of removing hydrogen sulfide from a stream is by extraction with an amine such as monoethanol amine. However, many amines are not very selective and a good separation between hydrogen sulfide and carbon dioxide would be difficult. More selective scrubbing agents such as diisopropyl amine would be preferred.

Hydrogen sulfide can also be converted by liquid media absorption-air oxidation. The typical process scheme for processes in this category involves absorption of H$_2$S in a slightly alkaline solution containing oxygen carriers. Regeneration of the solution is by air oxidation. The H$_2$S is oxidized to elemental sulphur, which is usually collected at the regenerated solution surface as a froth. Filtering or centrifuging permits recovery of a sulphur cake. A variety of alkaline solutions are used depending on the process; some of these are quinone (Stretford process), arsenic-activated potassium carbonate (Giammaco-Vetrocoke process), sodium or ammoniumthioarsenate (Thylox process), aqueous ammonia with hydroquinone (Perox process), and sodium carbonate containing iron oxide in suspension (Ferrox process). The Stretford process is considered quite suitable and most preferred because it is a commercial process and the presence of carbon dioxide does not interfere with its operation.

It is desirable to reduce the concentration of sulfur compounds in the off gases as low as practically possible prior to combustion for energy recovery. It is preferred that the concentration of sulfur in the off gases is reduced so that there will be less than about 20 ppm after dilution with air needed for combustion in downstream power generation.

Oil shale retorting off-gas has a heating value lower than normally considered for gas turbine fuel. Considerable gas turbine experience exists on burning blast furnace gases with low heating values. Many Brown Boveri blast furnace installations currently operate on 80 to 90 Btu/scf (715 to 804 kcal/Nm$^3$) fuel, with the lowest report heating value being 76 Btu/scf (679 kcal/Nm$^3$). Some of these units start and accelerate on gas alone, while others use supplementary oil for starting.

Maintaining stable combustion on gas alone, after the gas turbine has been started and brought to speed on oil, appears feasible. Flame temperature calculations suggest, however, that heating value fluctuations must be closely controlled. The application of proven blast furnace system design techniques and the higher hydrogen content of the shale oil gas, compared with blast furnace gases, together with proper control of combustor primary zone fuel-air ratio, is expected to provide stable combustion. The combustion of off-gases from oil shale retorting and the combustion of low Btu gases is discussed in *Process Generation from Shale Oil Process Off-Gas*, McCrank, J. M. and Short, G. R., presented at the IEEE-ASME Joint Power Generation Conference, Sept. 19-22, 1976; *Low Grade Fuel Used in Gas Turbines*, ZABA, T., Oil and Gas Journal, Apr. 25, 1977; and *Recent Experimental Results on Gasification Combustion of Low Btu Gas for Gas Turbines*, Crouch, W. B. and Klaptach, R. D. and Schlinger, W. G. and Vitti, G. E., April 1974 Combustion, p. 32-38.

DRAWING

The attached drawing ia a schematic representation of an in situ oil shale retorting process with energy recovery from generated off gases.

In situ retorts 2 and 3 have been developed in shale oil deposit 1. These in situ retorts have been formed by conventional means, preferably by sublevel caving techniques. The bottom of the retort is commonly slanted so retorted shale oil can run out of the retorts and into a product collection area. Pipes or access ways 6 and 7 lead from near the base of the retort to a separation zone. Hot retorting gas is passed through the retorts, preferably in a downward direction. A preferred method of generating hot retorting gas is to pass air, air plus hydrocarbon, air plus in situ off gas recycle, or air plus steam, through the retort while initiating a flame front, for example by a burner. The flame front generates hot retorting gases and heat which effectively removes the shale oil from the oil shale. A mixture of shale oil, water and off gases are collected from retort 3 through line 7 to separation zone 8. Separation zone 8 performs a rough separation between shale oil, water and off gases. This separation is commonly done by gravity because of different densities in the three components. Merely by allowing sufficient residence time in a vessel or area, a separation can be achieved. Water and shale oil can be removed from separation zone 8 by line 21 and 9. Off gases from retort 3 which have been crudely separated from other materials in separation zone 8 is passed up through line 10 to dedusting zone 11. These off gases still contain entrained water, shale oil, dust and various combustion products. Off gases from in situ retorting commonly contain small particles of dust and other solid materials which can be detrimental to downstream equipment such as compressors. In dedusting zone 11, the off gases are contacted with water 12 whereby the dust is entrained within the water and removed to, for example, waste water treating 13. Water treatment can be carried out by well known activated sludge processes. The dedusted off gases are then passed through line 14 to compressor 15. The gases are then compressed to about 160 pounds and then passed through line 16 to a separation zone 17. In this separation zone, either a knock-out drum or preferably an absorber, those hydrocarbons which were liquefied by compression, generally C$_4+$, are removed here. A substantial amount of suspended water will also be removed. Off gases of about 100°-200° F. are commonly fed to multistage compression zone having interstage cooling. Compressed off gases leave the compression zone at about 75°-100° F. The removal of these light hydrocarbons from the off gases increases the total recovery of shale oil from the retorting process and also removes a substantial amount of the nitrogen and sulfur content from the off gases. Water vapor is also condensed, increasing the heating value of the gas. The deoiled off gases are then passed through line 18 either to line 19 where they are passed on to processes 20 where they are used as fuel gas, or the separated off gases from zone 17 are passed through line 18 to zone 30 for further purification. Separated oils from zone 17 are passed through line 22 for recovery and separated water from zone 17 are passed through line 21 for possible use in the process, purification by water treatment, or other means of disposal. Zone 30 is a hydrolysis zone where the off gases are contacted with water and dilute caustic soda at a temperature of about 50°-200° F. to hydrolyze carbonyl sulfide, if present, to hydrogen sulfide. The off gases containing hydrogen sulfide both from the hydrolysis step and also from the initial in situ retorting are then passed through line 31 to a desulfurization zone 32. In desulfurization zone 32 sulfur compounds, especially hydrogen sulfide, are converted to sulfur and removed by means of pipe 33. A preferred method for desulfurization or conversion of hydrogen sulfide to sulfur is a Stretford process. Purified off gases leave zone 32 through line 34 for combustion in zone 35. Air 50 is compressed in compressor 49 to about 150-200 psi and passed through line 61 and 62 to the combustion zone 35. The air is approximately at the same pressure as the off gases which are introduced through line 34 to combustion zone 35. Commonly, an excess of air is compressed and a portion is passed to combustion zone 35 and the excess is passed through line 63 through an air expander 64 which is connected through drive 65 to a power generator 66 for energy recovery. Expanded air from air expander 64 is passed through line 67 for use in in situ retorting. This expanded air should be preferably at the proper pressure for introduction through lines 69 and 68 through access means 4 and 5 at the top of retorts 2 and 3 respectively. Combustion gases from combustion zone 35 are passed through line 36 to turbine 37. Turbine 37 is connected through drive 38 to power generator 39 for the generation of power or electricity. Turbine 37 can also be connected through drive 47 and 48 to compressor 49 for the compression of air for use in this process. Off gases from turbine 37 are passed through line 40 for heat exchange and further recovery of energy. This can be achieved by passing the gases through line 40 through heat exchanger 41 where water 44 is passed through line 46 and heat is exchanged between off gases and water to produce steam which exits via line 45 for use in processes 43. The gases from heat exchanger 41 are passed out through line 42 and either passed to the atmosphere or to other processes for further treatment or clean up.

I claim:

1. A process for the in situ retorting of oil shale and energy recovery from generated off gases comprising:
    forming a subterranean in situ retort containing rubblized oil shale having a porosity of about 5 to about 40 percent;
    passing a retorting gas through the in situ retort to effectively retort the oil shale and produce a mixture of shale oil and off gases;
    subjecting the mixture of shale oil and off gases to a preliminary separation to remove gross quantities of shale oil and water from the off gases;
    passing a portion of the off gases to a purification zone so as to remove off gas impurities which would be detrimental to the environment or the operation of downstream equipment; wherein said purification zone removes harmful amounts of dust particles, and reduces entrained shale oil to less than about 500 ppm by increasing the pressure of the off gases to at least about 150 psig and removing condensable oil; and
    passing a portion of the purified off gases to a gas turbine where said off gases are burned and power is generated.

2. The process of claim 1 wherein the entrained shale oil is removed by increasing the pressure of the off gases to about 150 to about 200 psig.

3. A process for the in situ retorting of oil shale and energy recovery from generated off gases comprising:
    forming a subterranean in situ retort containing rubblized oil shale having a porosity of about 5 to about 40 percent;
    passing a retorting gas through the in situ retort to effectively retort the oil shale and produce a mixture of shale oil and off gases;
    subjecting the mixture of shale oil and off gases to a preliminary separation to remove gross quantities of shale oil from the off gases;
    passing a portion of the off gases to a dedusting zone wherein the concentration of dust in the off gases is reduced to a level which would not be detrimental to downstream equipment;
    passing a portion of the off gases to a deoiling zone wherein a substantial amount of shale oil entrained in the off gases is removed by increasing the pressure of the off gases to at least 150 psig, thereby reducing the oil content to less than 500 ppm by removing condensable oil; and
    passing a portion of the purified off gases to a gas turbine where said off gases are burned and power is generated; reduces entrained shale oil to less than about 500 ppm by increasing the pressure of the off gases to at least about 150 psig and removing condensable oil; and
    passing a portion of the purified off gases to a gas turbine where said off gases are burned and power is generated.

4. The process of claim 3 wherein the concentration of dust in the off gases is reduced to less than about 1 grain per cubic foot.

5. The process of claim 3 wherein gas for use in in situ retorting is heated by waste heat from the gas turbine.

6. The process of claim 3 wherein waste heat from power generation is used to heat retorting gases used in in situ retorting of oil shale.

7. A process for energy recovery from combustion off gases from an in situ oil shale retorting, comprising:
    passing the off gases to a dedusting zone wherein the concentration of dust in the off gases is reduced to less than about one grain per cubic foot;
    passing the off gases to a deoiling zone wherein the concentration of oil in the off gases is reduced to less than about 500 ppm by compressing the off gases to a pressure in excess of about 150 psig so that oil and light condensable hydrocarbons are condensed, and then removing the condensed oil and hydrocarbons from the off gases; and
    passing the off gases to a desulfurization zone wherein the concentration of sulfur in the off gases is reduced to less than about 10 ppm;
    passing the purified off gases to a power generation zone wherein said gases are burned and power generated in a gas turbine.

8. The process of claim 7 wherein the concentration of dust in the off gases is reduced in the dedusting zone by contacting the off gases containing dust with water so that a substantial portion of the dust becomes entrained in the water, and then separating the water containing dust from the off gases.

9. The process of claim 8 wherein the concentration of sulfur in the off gases is reduced in the desulfurization zone by first hydrolyzing carbonyl sulfide to form hydrogen sulfide, then oxidizing a substantial amount of the hydrogen sulfide present in the off gas to sulfur, and then removing the sulfur.

10. The process of claim 9 wherein the purified off gases are burned with an oxygen containing gas in a combustion chamber, and the combustion gases from the combustion chamber are passed to a gas power turbine wherein power is generated.

* * * * *